(12) United States Patent
Peng et al.

(10) Patent No.: US 7,535,797 B2
(45) Date of Patent: May 19, 2009

(54) HIGH-RESOLUTION ULTRASOUND DISPLACEMENT MEASUREMENT APPARATUS AND METHOD

(75) Inventors: Qiyu Peng, Palo Alto, CA (US); Li-Qun Zhang, Wilmette, IL (US)

(73) Assignee: Rehabtek, Wilmette, IL (US)

( * ) Notice: Subject to any disclaimer, the term of this patent is extended or adjusted under 35 U.S.C. 154(b) by 81 days.

(21) Appl. No.: 11/471,129

(22) Filed: Jun. 20, 2006

(65) Prior Publication Data
US 2007/0291591 A1    Dec. 20, 2007

(51) Int. Cl.
G01S 15/00 (2006.01)
(52) U.S. Cl. .................................................. 367/101
(58) Field of Classification Search ........... 367/99–101, 367/125–127, 900, 901, 905; 73/609, 620; 600/442, 443, 455, 458; 342/118, 141, 159–164
See application file for complete search history.

(56) References Cited

U.S. PATENT DOCUMENTS

| | | | | |
|---|---|---|---|---|
| 4,257,275 A | * | 3/1981 | Kurita et al. ............. | 73/861.06 |
| 4,809,002 A | * | 2/1989 | Togashi et al. ............. | 342/160 |
| 4,862,177 A | * | 8/1989 | Wong ......................... | 342/160 |
| 5,014,712 A | | 5/1991 | O'Donnell | |
| 5,457,818 A | * | 10/1995 | Butler ........................ | 455/227 |
| 5,573,497 A | | 11/1996 | Chapelon | |
| 5,738,635 A | | 4/1998 | Chapelon et al. | |
| 5,743,863 A | | 4/1998 | Chapelon | |
| 5,938,611 A | | 8/1999 | Muzilla et al. | |
| 5,961,463 A | | 10/1999 | Rhyne et al. | |
| 5,964,706 A | | 10/1999 | Mo et al. | |
| 5,984,869 A | | 11/1999 | Chiao et al. | |
| 6,009,046 A | | 12/1999 | Hossack et al. | |
| 6,010,456 A | | 1/2000 | Rhyne | |
| 6,050,947 A | * | 4/2000 | Rhyne et al. ............. | 600/447 |
| 6,056,693 A | | 5/2000 | Haider | |
| 6,095,977 A | | 8/2000 | Hall et al. | |
| 6,113,545 A | | 9/2000 | Chiao et al. | |
| 6,123,670 A | | 9/2000 | Mo | |

(Continued)

FOREIGN PATENT DOCUMENTS

JP    358191504    11/1983

(Continued)

OTHER PUBLICATIONS

O'Donovan, et al., "Application of Golay Codes and Piezoelectric Ultrasound Transducers to Biomedical Noninvasive Measurement," IEEE Transactions on Electrical Insulation, vol. 28 No. 1, Feb. 1993, pp. 93-100.*

(Continued)

Primary Examiner—Dan Pihulic
(74) Attorney, Agent, or Firm—Robert C. Haldiman; Husch Blackwell Sanders LLP

(57) ABSTRACT

An ultrasound method of measuring displacement with high resolution includes transmitting a pair of Golay's complementary sequences or other complementary sequences, receiving echoes from the object and performing pulse compression of the two sequences of echoes. The displacement of the object between the two transmissions is derived from the residual clutter signals around the mainlobe of the compressed pulse output. Furthermore, movement velocity, thickness, strain, elastic stiffness, and viscous damping of the object or regions of the object can be determined subsequently.

47 Claims, 17 Drawing Sheets

U.S. PATENT DOCUMENTS

| | | | |
|---|---|---|---|
| 6,146,328 | A | 11/2000 | Chiao et al. |
| 6,155,980 | A | 12/2000 | Chiao et al. |
| 6,179,780 | B1 | 1/2001 | Hossack et al. |
| 6,186,949 | B1 | 2/2001 | Hatfield et al. |
| 6,193,663 | B1 | 2/2001 | Napolitano et al. |
| 6,210,332 | B1 | 4/2001 | Chiao et al. |
| 6,213,947 | B1 | 4/2001 | Phillips |
| 6,239,741 | B1 | 5/2001 | Fontana et al. |
| 6,241,674 | B1 | 6/2001 | Phillips et al. |
| 6,312,384 | B1 | 11/2001 | Chiao |
| 6,375,618 | B1 | 4/2002 | Chiao et al. |
| 6,487,433 | B2 | 11/2002 | Chiao |
| 6,491,631 | B2 | 12/2002 | Chiao et al. |
| 6,558,328 | B2 | 5/2003 | Chiao et al. |
| 6,679,846 | B2 | 1/2004 | Napolitano et al. |
| 6,760,486 | B1 | 7/2004 | Chiao et al. |
| 6,790,182 | B2 | 9/2004 | Eck et al. |
| 6,796,944 | B2 | 9/2004 | Hall |
| 6,809,681 | B1 * | 10/2004 | Niechayev .................. 342/159 |
| 2001/0044278 | A1 | 11/2001 | Chiao et al. |
| 2002/0049381 | A1 | 4/2002 | Eck et al. |
| 2002/0091317 | A1 | 7/2002 | Chiao et al. |
| 2002/0091318 | A1 | 7/2002 | Chiao et al. |
| 2003/0032884 | A1 | 2/2003 | Smith et al. |
| 2003/0216644 | A1 | 11/2003 | Hall |
| 2004/0039283 | A1 | 2/2004 | Banjanan et al. |
| 2005/0096544 | A1 | 5/2005 | Hao et al. |
| 2005/0111846 | A1 | 5/2005 | Steinbacher et al. |
| 2006/0074320 | A1 | 4/2006 | Yoo et al. |
| 2007/0291591 | A1 * | 12/2007 | Peng et al. .................. 367/101 |

FOREIGN PATENT DOCUMENTS

JP 358191504 A * 11/1983

OTHER PUBLICATIONS

Trahey, et al., "Measurement of Local Speckle Pattern Displacement to Track Blood Flow in Two Dimensions", 1987 IEEE Ultrasonics Symposium, pp. 957-961.*

International Search Report and Written Opinion, App. No. PCT/US07/71667 (Aug. 25, 2008).

O'Donovan, et al., "Application of Golay Codes and Piezoelectric Ultrasound Transducers to Biomedical Noninvasive Measurement," IEEE Transaction on Electrical Insulation, 28:1, pp. 93-100 (Feb. 1993).

* cited by examiner

HIGH-RESOLUTION ULTRASOUND DISPLACEMENT MEASUREMENT APPARATUS AND METHOD

CROSS-REFERENCE TO RELATED APPLICATIONS

None

STATEMENT REGARDING FEDERALLY SPONSORED RESEARCH

Not Applicable.

APPENDIX

Not Applicable.

BACKGROUND OF THE INVENTION

Field of the Invention

The present invention relates to non-invasive measurements of displacement, velocity, thickness, and strain in both medical and industrial applications.

In traditional pulse echo techniques for the measurement of displacement, ultrasound (radar, or sonar) waves are transmitted and the echoes from the object are received. The displacement is measured by comparing the time shift, frequency shift or phase shift between two echoes. For example, traditional ultrasound methods to measure the thickness of the cornea (about 500 nm) is to derive it from the time interval between two peaks of the echoes from the two sides of cornea. The traditional ultrasound method to measure the velocity of the blood flow is to measure the Doppler frequency shift in time domain or frequency domain. The traditional ultrasound imaging or measurement of elasticity derives the displacement or strain within a body by detecting the time shift of the echoes through correlations in time domain or frequency domain.

The resolution of the displacement measurement based on traditional pulse-echo technique is limited by the center frequency of the transmitted wave, the sampling rate of the echoes, and electronic noise in the measurement system. There is a need in the art to overcome these limitations and to increase accuracy, resolution, responsiveness, sensitivity, resistance to noise and speed.

SUMMARY OF THE INVENTION

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

In general, the invention provides a system for determining the displacement of an object or a desired region in an object with high resolution and the measurement is highly robust to noise. The system includes transmitting a pair of Golay's complementary sequences (GCS), receiving two echoes from the same object or the same region of an object, compressing the pulse, and eliminating the mainlobe. The displacement of the object between the two transmissions is then derived from the residual clutter signals around the mainlobe of the compressed pulse output.

Implementations of the invention may include one or more of the following features. A signal generator circuit generates the Golay's complementary sequences to control the device of wave transmitter. The wave transmitter can be an ultrasound transducer, a radar antenna, or a sonar transmitter. Echoes from the targeted region of the object are then received by a receiving device. In some situations, the device of wave transmitter and the receiving device can be the same device. A signal conditioning circuit performs pre-amplification, compensation for attenuation of the echoes, and bandpass filtering of the echoes. An analog-to-digital converter (ADC) samples the analog echoes into digital echoes. A digital signal processing device or a computer performs the pulse compression, mainlobe elimination, clutter collection, and displacement calculation (FIG. 1).

In another aspect, the invention provides a system for determining the velocity of an object or a desired region in an object. The system includes transmission of a pair of GCS sequences (A and B). The two corresponding echoes from the same object or the same region of an object are then received. The pulse is compressed and the mainlobe is eliminated. The displacement of the object or the desired region between two transmissions is derived from the residual clutter signals around the mainlobe of the compressed pulse output. The velocity of the object or the desired region is then derived from the displacement and time interval between the two transmissions.

In another aspect, the invention provides a system for determining the thickness of an object or a desired region in an object. The system includes transmission of a pair of GCS sequences. The two corresponding echoes from two sides of the same object or the same region are then received, with the pulse compressed and the mainlobe eliminated subsequently. The thickness of the object or the desired region is then derived from the residual clutter signals around the mainlobe of the compressed pulse output.

In another aspect, the invention provides a system for determining the strain in an object or a desired region in an object with high resolution and the measurement is highly robust. The system includes transmission of a pair of Golay's complementary sequences. The two corresponding echoes from the same object or the same region of an object are then received, with the pulse compressed and the mainlobe eliminated subsequently. The displacement of the areas or regions of an object between the two Golay transmissions is derived from the residual clutter signals around the mainlobe of the compressed pulse output. The strain of the object or the desired region is then derived from the displacements and overall size of the object or the desired region.

In another aspect, the invention provides a system for 2D or 3D mapping of the displacement in an object or a desired region in an object with high resolution and robust measurement. The system includes transmitting of a pair of Golay's complementary sequences. The two corresponding echoes from the same object or the same region of an object are then received, and the pulse is compressed and the mainlobe is eliminated subsequently. The displacement of the regions of the object between two transmissions is derived from the residual clutter signals around the mainlobe of the compressed pulse output. The 2D or 3D mapping of the displacement is then derived from the displacements measured in different positions in the 2D or 3D space.

In another aspect, the invention provides a system for 2D or 3D mapping the velocity of an object or a desired region in an object. The system includes transmitting of a pair of GCS sequences. The two corresponding echoes from the same object or the same region are then received, with the pulse compressed and the mainlobe eliminated subsequently. The displacement of the object or the desired region between two transmissions is then derived from the residual clutter signals around the mainlobe of the compressed pulse output. The velocity of the object or the desired region is then derived from the displacement and the time interval between the two transmissions. The 2D or 3D mapping of the velocity is then derived from velocities measured in different positions in the 2D or 3D spaces.

In another aspect, the invention provides a system for 2D or 3D mapping of the strain of an object or a desired region in an object with high resolution and robust measurement. The system includes transmitting of a pair of Golay's complementary sequences. The two corresponding echoes from the same object or the same region of an object are then received, pulse compressed and mainlobe eliminated. The displacement of the scatterers between two transmissions is derived from the residual clutter signals around the mainlobe of the compressed pulse output. The strain of the object or the desired region is then derived from the displacement and length of the object or the desired region.

A digital signal processing device or a computer performs pulse compression, mainlobe elimination, clutter collection, and displacement calculation. The 2D or 3D mapping of the strain is then derived from the strain measured in different positions in the 2D or 3D space.

Various aspects of the invention may provide one or more of the following advantages. Mechanical properties of an object or a region in an object, such as elastic stiffness and viscous damping, can be derived from the displacement, velocity, thickness, strain of the object or regions in the object.

Those and other advantages of the invention, along with the invention itself, will be more fully understood after a review of the following figures, detailed description and claims.

BRIEF DESCRIPTION OF THE DRAWINGS

FIG. 6(*b*) Clutters produced by different amounts of time shifts (1/10, 2/10, 3/10, 4/10 and 5/10 of the width of the GCS code). The length N of the CGS is 256. The X-axis is the sampling point n of the auto-correlation function.

DETAILED DESCRIPTION OF THE PREFERRED EMBODIMENTS

The following description of the preferred embodiment(s) is merely exemplary in nature and is in no way intended to limit the invention, its application, or uses.

Embodiments of the invention provide techniques for non-invasively measuring displacement, velocity, thickness, and strain in medical and industrial applications. For example, systems of the invention can detect internal displacement or strain in vivo under internal or external perturbations, which is related to the tissue elastic modulus or stiffness. To measure the displacement, an ultrasound transducer is excited by a pair of complementary sequences. In the depicted embodiment, these are Golay Complementary Sequences (GCS) with a controlled time interval related to the distance of the tissue to be measured and the speed of the ultrasound in the tissue. The two echoes from the tissue are then picked up by the same or another ultrasound transducer. In some situation, the echoes need to be pre-amplified to compensate for the energy loss in the tissue. Then, the analog echoes are sampled by Analog-to-digital converter and transferred to a computer or an electronic device (a microprocessor, a digital signal processor, or FPGA). The computer performs the operation of pulse compression, mainlobe elimination, clutter collection, and displacement calculation.

Figure 1:
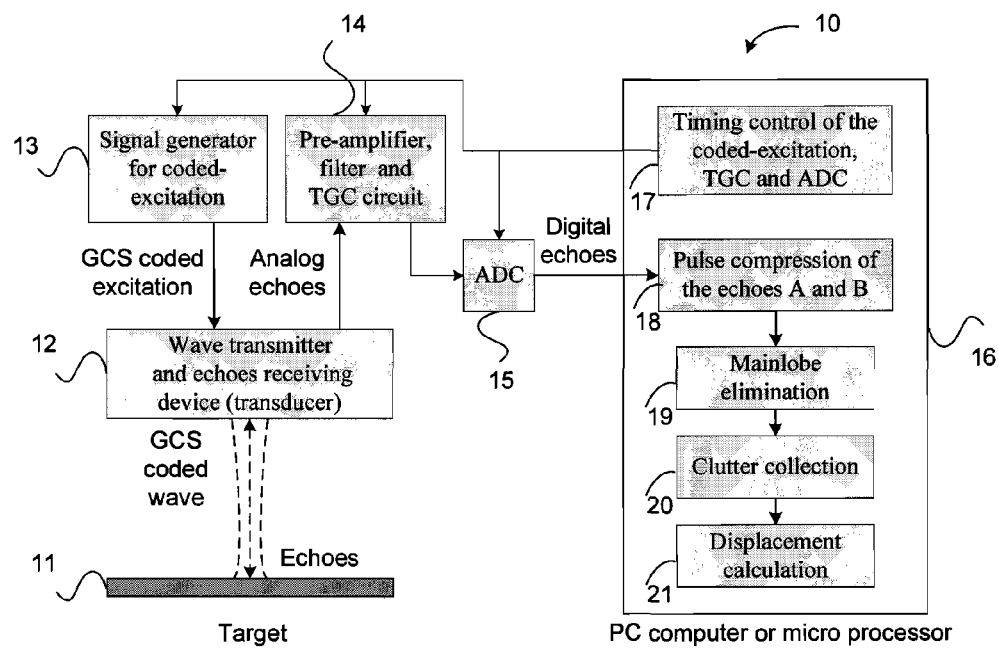
FIG. 1 is a simplified diagram of a displacement measurement based on the clutter signal of Golay's complementary sequences.

Referring to FIG. 1, a system for displacement measurement 10 includes the target to be measured 11, wave transmitter and echo receiving devices (transducers) 12, signal generator for coded-excitation 13, pre-amplifier, filter and time gain compensation (TGC) device 14, analog/digital converter ADC 15, PC computer or microprocessor 16. The set 14 may have a functional block for timing control of the coded excitation, TGC and ADC 17, pulse compression of the echoes A and B 18, mainlobe elimination 19, clutter collection 20 and displacement detection 21.

The wave transmitter and echo receiving devices (transducers) 12 are the transducers for generating the ultrasound (or radar, sonar) wave toward the target and receiving the echoes from the target. The signal generator for the coded excitation 13 is configured to generate the GCS pair to control the transducer. The pre-amplifier, filter and TGC device 14 is configured to pre-amplify, filter and compensate for the energy loss of the echoes caused by attenuation. The ADC 15 is configured to convert the analog echoes to digital echoes. The PC computer or microprocessor 16 is configured to control the timing of the coded excitation, TGC and ADC 17, performing pulse compression of the echoes A and B 18, performing mainlobe elimination 19, performing clutter collection 20, and performing displacement detection 21.

The Golay's complementary sequences are a pair of sequences A $(a_0, a_1, \ldots, a_{N-1})$ and B $(b_0, b_1, \ldots, b_{N-1})$. The length of A and B are N. The element of A and B are either $-1$ or 1. In the depicted embodiment, a feature of the GCS is:

$$c_j + d_j = 2N \quad j = 0$$

$$c_j + d_j = 0 \quad j \neq 0 \quad (1)$$

where $c_j$ and $d_j$ are the auto-correlation of GCS A and GCS B:

$$c_j = \begin{cases} \sum_{i=j}^{i=N-1} a_i a_{i-j} & j = 0, \ldots, N-1 \\ \sum_{i=0}^{i=N-1+j} a_i a_{i-j} & j = -N+1, \ldots, -1 \end{cases} \quad (2)$$

$$d_j = \begin{cases} \sum_{i=j}^{i=N-1} b_i b_{i-j} & j = 0, \ldots, N-1 \\ \sum_{i=0}^{i=N-1+j} b_i b_{i-j} & j = -N+1, \ldots, -1 \end{cases} \quad (3)$$

Figure 2:
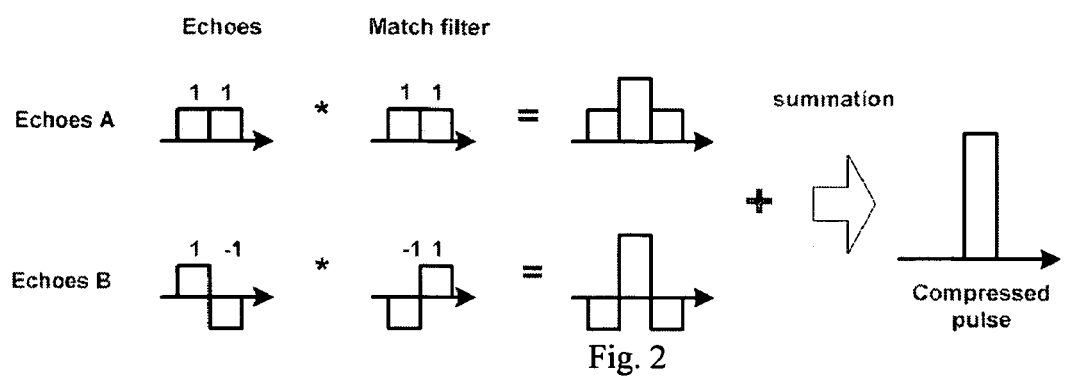
FIG. 2 is a demonstration of pulse compression using the GCS.
Figure 3A:
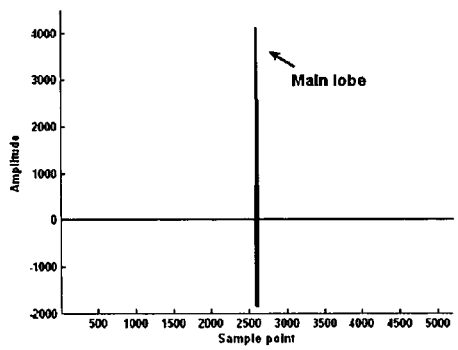
FIG. 3 is the effect of the object movement in the compressed pulse; (*a*) the object does not move between GCS A and GCS B; (*b*) the object moves 7.5 µm between GCS A and GCS B; (*c*) the object moves 15 µm between GCS A and GCS B; (*d*) the object moves 30 µm between GCS A and GCS B.
Figure 3B:
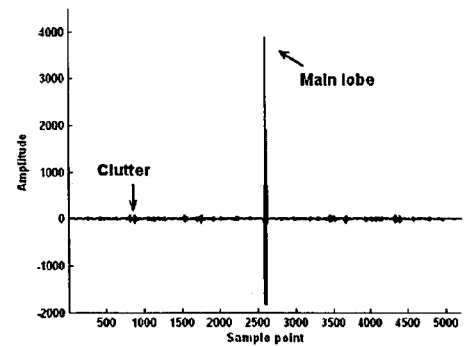
Figure 3C:
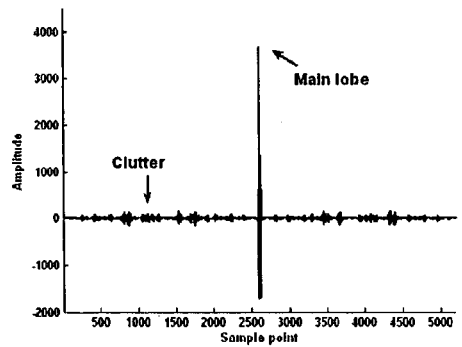
Figure 3D:
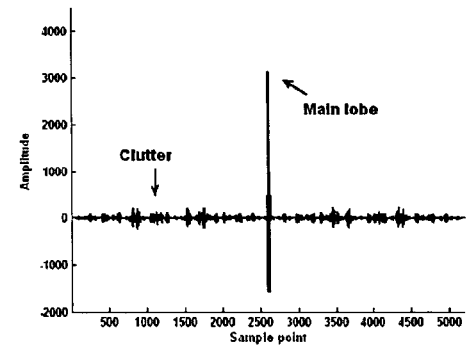
Figure 4A:
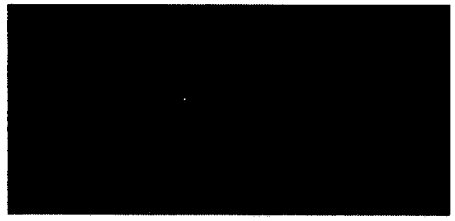
FIG. 4 is the effect of the tissue movement in the ultrasound images without logarithmic compression. The image size is about 5 mm×5 mm. (*a*) the tissue did not move between GCS A and GCS B; (*b*) the tissue moved 7.5 µm between GCS A and GCS B; (*c*) the tissue moved 15 µm between GCS A and GCS B; (*d*) the tissue moved 30 µm between GCS A and GCS B.
Figure 4A:
Figure 4B:
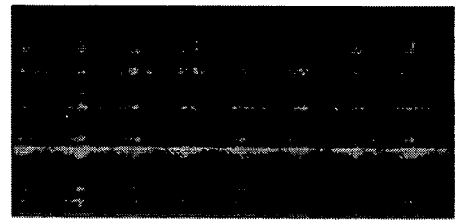
Figure 4B:
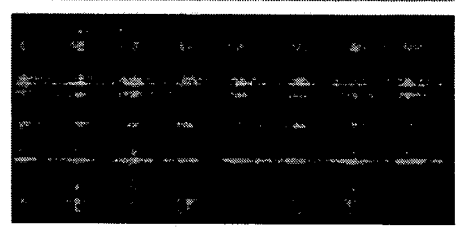
Figure 4C:
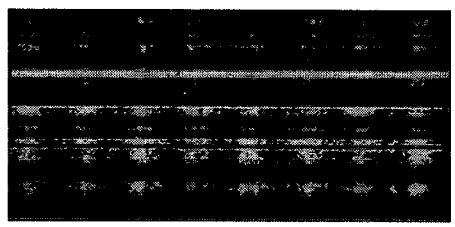
Figure 4C:
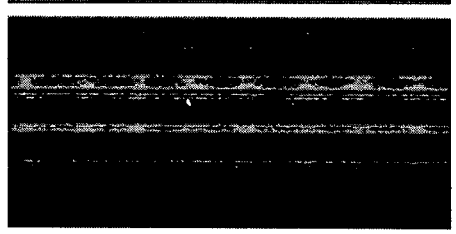
Figure 4D:
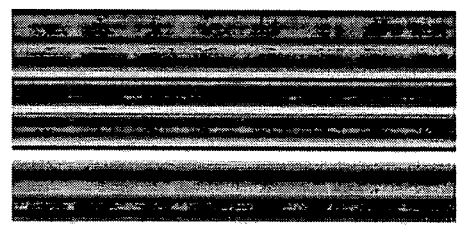
Figure 4D:
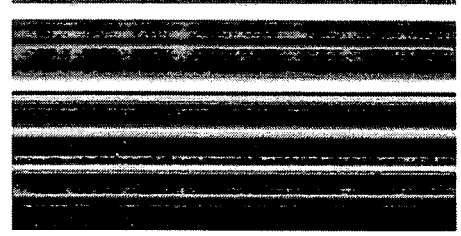

The pulse compression is a digital signal processing process to obtain sharp echoes from the target. When the GCS A and GCS B are used to control the transducer sequentially, and then the auto-correlations of the two echoes from the same object are summed, a very sharp pulse called compressed pulse or mainlobe will be obtained (demonstrated in FIG. 2). The operation of the auto-correlation and summation to obtain the compressed pulse is called pulse compression.

A very sharp echo (also called mainlobe) can be obtained from the pulse compression. The displacement of the object during the time interval between GCS A and GCS B induces noise (also called clutter) around the mainlobe and reduction of the mainlobe amplitude.

FIG. 3 shows the effect of the displacement of the target on the compressed pulse. FIG. 3(*a*) shows the compressed pulse (summation of the two auto-correlations) when the object does not move between GCS A and GCS B. In FIG. 3(*b*), (*c*) and (*d*), the object moves 7.5 μm, 15 μm and 30 μm between GCS A and GCS B, respectively. In the simulation the center frequency $f_0$ and $-3$ dB bandwidth η of the transducer used are 10 MHz and 70%, respectively. The length N and width $T_c$ of the GCS are 256 and 100 ns respectively. The sampling rate $f_s$ of the echoes is 100 MHz.

In 2-D ultrasound imaging, the clutters cause artifacts in the image. FIG. 4 shows the effect of the tissue movement in the ultrasound images without logarithmic compression. In FIG. 4(*a*), the tissue did not move between GCS A and GCS B. FIGS. 4(*b*), (*c*) and (*d*) show the amplitude of summed auto-correlations of the echoes when the tissue moved 7.5 μm, 15 μm and 30 μm between GCS A and GCS B, respectively. The image size is about 5 mm×5 mm.

Figure 5:
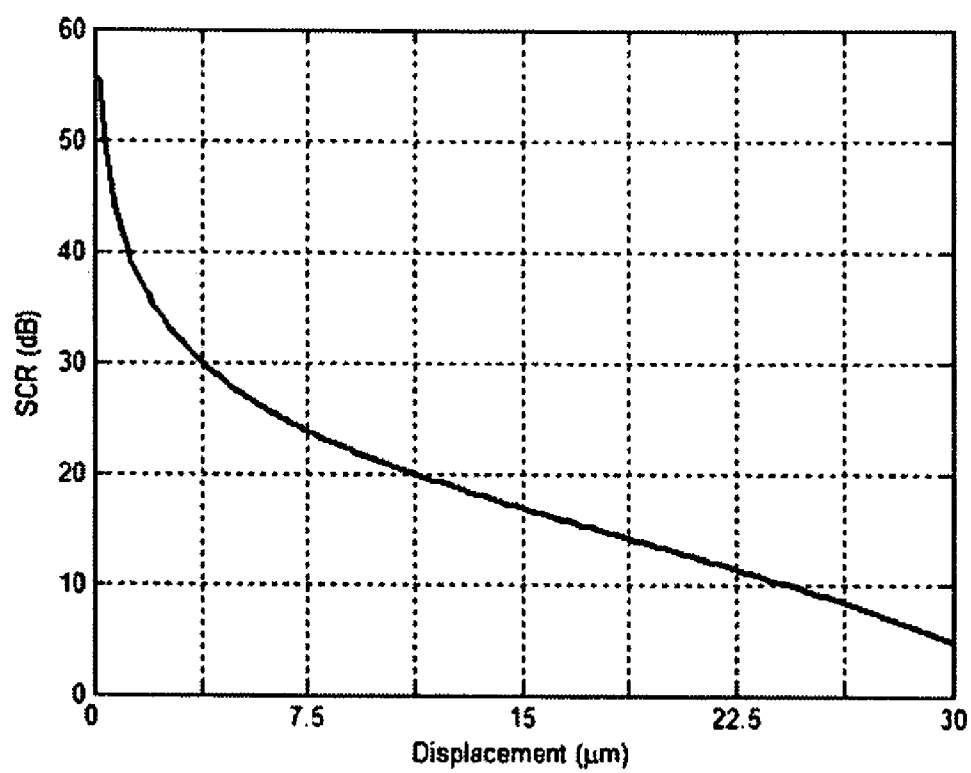
FIG. 5 is the relation between the movement of the tissue between two GCS stimulations and the SCR of the compressed pulse. The central frequency $f_0$ and −3 dB bandwidth η of the transducer used in simulation are 10 MHz and 70% respectively. The length N and width $T_c$ of the GCS are 256 and 100 ns respectively. The sample rate $f_s$ of the digital echoes is 100 MHz.

FIG. 5 shows the relationship between the object movement between the GCS A and GCS B stimulations and the signal to clutter ratio (SCR) of the compressed pulse. The movement of the object between GCS A and B stimulations is related to the SCR of the compressed pulse. The center frequency $f_0$ and $-3$ dB bandwidth η of the transducer used simulation are 10 MHz and 70%, respectively. The length N and width $T_c$ of the GCS are 256 and 100 ns respectively. The sampling rate $f_s$ of the echoes is 100 MHz.

Figure 6A:
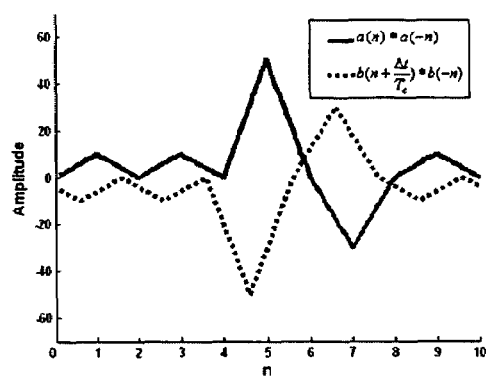
FIG. 6(*a*) Partial waveforms of the auto-correlations of the echoes from GCS A and GCS B are shown by the solid and dotted curves, respectively. The dotted waveform is shifted by 5/10 of the width of the GCS code.
Figure 6B:
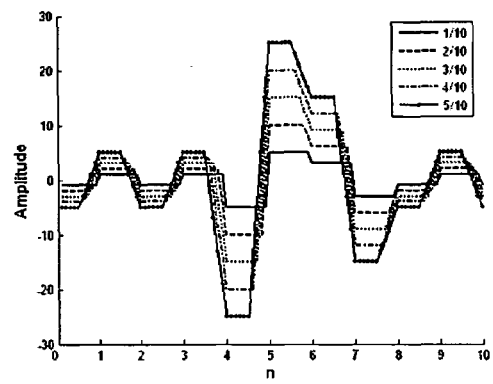

When the two echoes (from GCS A and GCS B respectively) have some time shift, the sum of the auto-correlations of the two echoes will produce clutters. The amplitude of the clutters is proportional to the time shift. The larger the time shift is, the larger the clutter. In FIG. 6(*a*) partial waveforms of the auto-correlations of the echoes from GCS A and GCS B are shown by the solid and dotted curves, respectively. The dotted waveform is shifted by 5/10 of the width of the GCS code. FIG. 6(*b*) shows clutters produced by different amounts of time shifts (1/10, 2/10, 3/10, 4/10 and 5/10 of the width of the. The length N of the GCS is 256. The X-axis is the sampling point n of the auto-correlation function.

In traditional pulse-echo methods, the displacement is derived from the time shift between two echoes. The accuracy of the calculation of the time shift is limited by the noise level, bandwidth of the transducer and the sampling rate of the ADC.

In this invention, the amplitude of the clutter (treated as noise in traditional methods), instead of the time shift, is used to derive the displacement. The bandwidth of the transducer and the sampling rate of the ADC have no direct effect on the amplitude of the clutter. The noise has little effect on the clutter since the pulse compression eliminates most of the white noise. Therefore, the amplitude of the clutter is much more robust measurement of the object displacement than the time shift.

The displacement of the object has a relationship with the SCR (signal to clutter ratio) of the compressed pulse with the Golay coded excitation (see FIG. 5). However, the SCR is not a reliable measure of the object displacement due to the limitation of the sampling precision and the noise in a physical system. Therefore, a new parameter $S_{ac}$ is used to replace the SCR to measure the object displacement. $S_{ac}$ is the sum of the absolute value of all clutters. Usually, the width of the mainlobe equals to the width of one single pulse. Therefore, $$S_{ac} = \sum_{t=0}^{t=L/2-l} |P_c(t)| + \sum_{t=L/2+l}^{t=L} |P_c(t)|$$

where, $P_c(t)$ is the compressed pulse. L is the length of the whole Golay sequence/code. l is the width of a single pulse.

Figure 7:
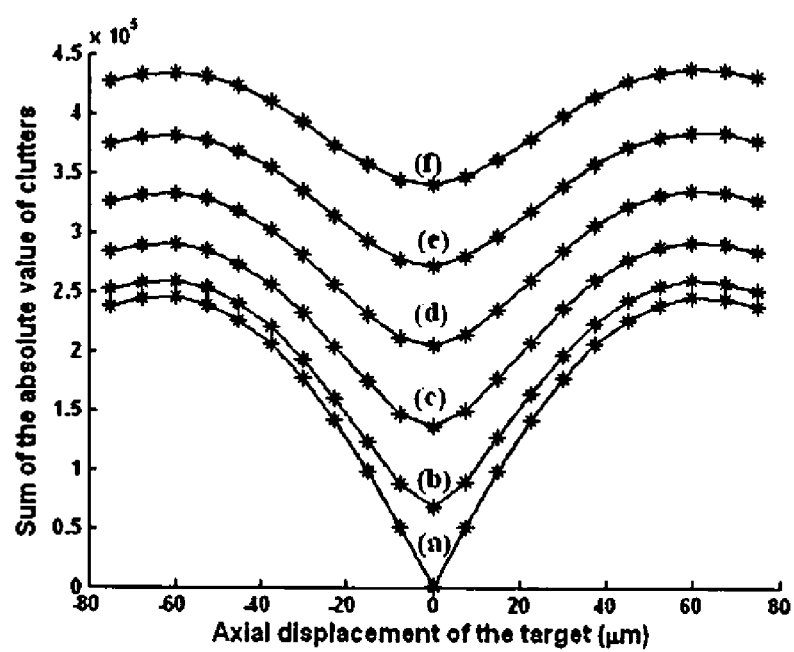
FIG. 7 The $S_{ac}$-displacement curves with different noise level in the echoes. The parameter settings of the simulation are the same as those in FIG. 3. The value of $S_{ac}$ when the displacements equal to d=±7.5 µm, =±15 µm, . . . , 75 µm are marked by the stars in each of the curves. The amplitude of the echoes is normalized to 1. (a): no noise. (b)~(f): random noise uniformly distributed in the interval (−0.2, 0.2), (−0.4, 0.4), (−0.6, 0.6), (−0.8, 0.8) and (−1, 1) respectively.

FIG. 7 shows the relationship between the object displacement and the $S_{ac}$ at different noise levels, and the displacement measurement resolution of the system is almost unlimited if there is no noise. The white noise will only produce an offset to the relation between the displacement and $S_{ac}$. FIG. 7 shows the $S_{ac}$-displacement curves with different noise level in the echoes. The parameter settings of the simulation are the same as those in FIG. 3. The value of $S_{ac}$ when the displacements equal to d=±7.5 μm, ±15 μm, . . . , ±75 μm are marked by the stars in each of the curves. The amplitude of the echoes is normalized to 1. In FIG. 7(a) there is no noise. In FIG. 7(b)~(f) random noise is uniformly distributed in the interval (−0.2, 0.2), (−0.4, 0.4), (−0.6, 0.6), (−0.8, 0.8) and (−1, 1) respectively.

Figure 8:
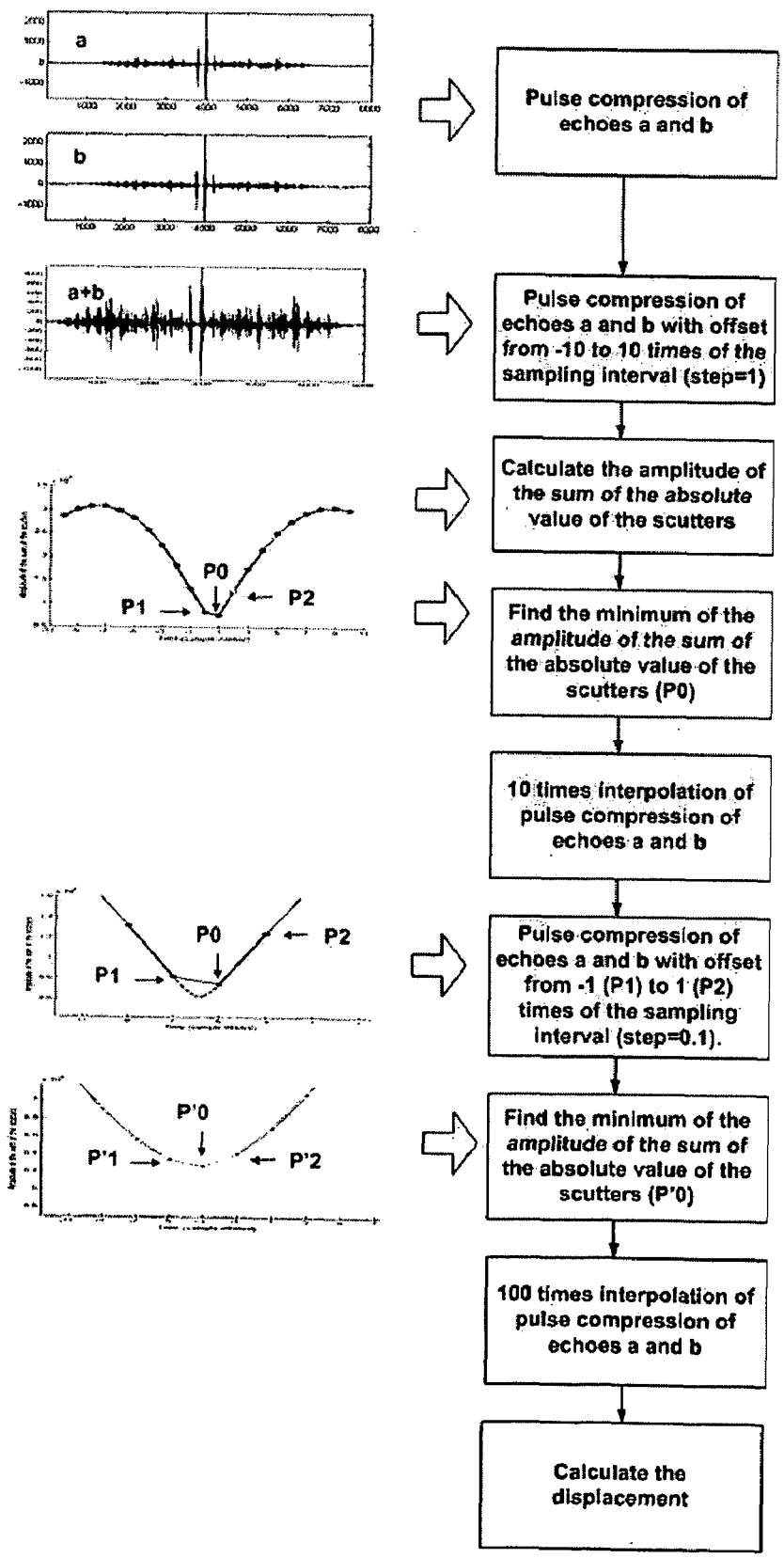
FIG. 8 the flowchart of the algorithm for calculating the displacement of a single object.

FIG. 8 shows the algorithm for the displacement measurement of a single target, including the following 9 steps: (1) Pulse compression of echoes A and B; (2) Pulse compression of echoes A and B with the shift ranging from −10 to 10 times of the sampling interval (step=1); (3) Calculating the amplitude of the sum of the absolute value of the clutters; (4) Find the minimum of the amplitude of the sum of the absolute value of the clutters (P0) (5) 10 times interpolation of pulse compression of echoes A and B; (6) Pulse compression of echoes A and B with offset from −1 (P1) to 1 (P2) times of the sampling interval (step=0.1); (7) Find the minimum of the amplitude of the sum of the absolute value of the clutters (P'0); (8) 100 times interpolation of pulse compression of echoes A and B; (9) Calculate the displacement.

In the measurement of the single target, the displacement was derived from the $S_{ac}$-displacement curve directly. The valid range of displacement measurement is determined by the monotonous zone of the $S_{ac}$-displacement curve (0~75 μm in FIG. 7). The out-of-range displacement can be adjusted into the monotonous zone of the $S_{ac}$-displacement curve by adding a certain time shift to echoes of GCS B.

Figure 9A:
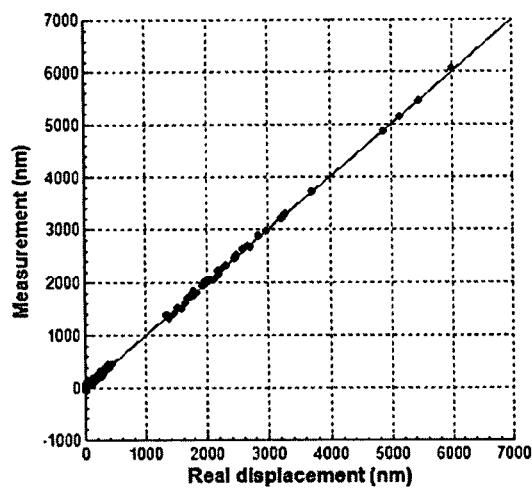
FIG. 9 the resolution of a real system. (a) the relationship between the real displacement and the measurement based on the clutter signal. (b) histogram of the distribution of the measurement errors.
Figure 9B:
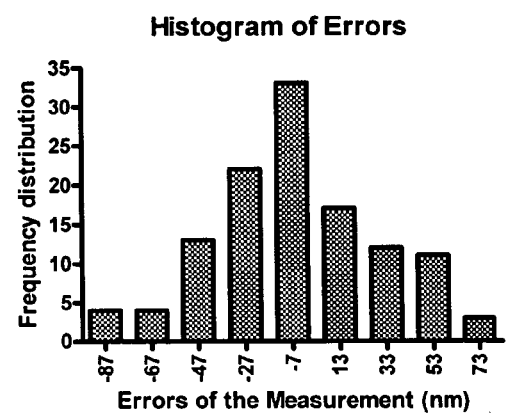

Based on the algorithm (FIG. 8), experimental data from an object is acquired by the system shown in FIG. 1 and analyzed. The actual displacements range from 1 nm to 6 μm in the experiment. The mean and STD of the error over all the measurements is −5.76 nm±36.27 nm. The actual displacement and the ultrasound measured displacement based on the clutter signal are compared in FIG. 9(a). The histogram of the measurement errors is shown in FIG. 9(b).

Figure 10:
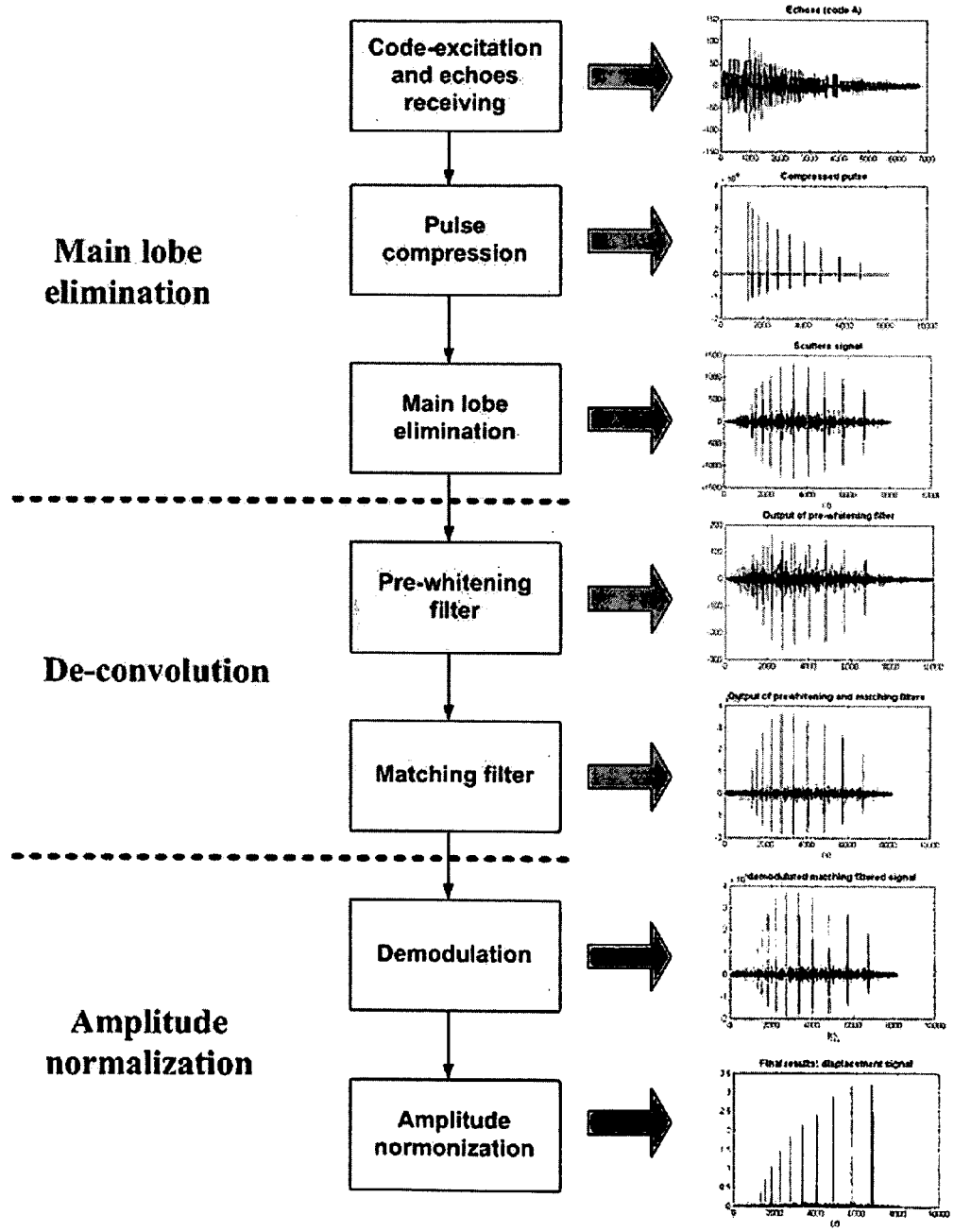
FIG. 10 the algorithm for displacement measurement in a desired region in an object.

FIG. 10 shows the algorithm for displacement measurement in a desired region in an object. The algorithm is divided into three parts: mainlobe elimination, matched filtering, and amplitude normalization.

Mainlobe elimination: the purpose of mainlobe elimination is to extract the clutter signal from the compressed pulse. When the time interval between GCS A and GCS B is very short, the displacement in the desired region of the object is negligible. Therefore, the compressed pulse with very short time interval has only mainlobe and is subtracted from the compressed pulse with long time interval to eliminate the mainlobe.

De-convolution: the purpose of de-convolution is to accumulate the energy of the clutters and eliminate the overlap of the clutters. A pre-whitening filter is used to improve the SNR of the de-convolution. Pre-whitening aims to make the signal contains equal-strength components at all frequencies. A pre-whitening filter transform a non-white signal into a nearly white signal. This is performed by a predictor. The way the predictor whitens the signal is that it attempts to predict sample n based on the information from the previous samples. If we subtract this prediction from the actual sample n, we will be left with the portion of sample n that is not related to the rest of the samples.

The predictor is designed using AR model:

$$\bar{s}(n) = \sum_{k=1}^{p} a_k s(n-k)$$

$a_k$ is the coefficients of the AR model. $a_k$ can be calculated according to the Yule-Walker equation:

$$\begin{bmatrix} R_0 & R_{-1} & \cdots & R_{1-p} \\ R_1 & R_0 & & R_{2-p} \\ \vdots & \vdots & & \vdots \\ R_{p-1} & R_{p-2} & \cdots & R_0 \end{bmatrix} \begin{bmatrix} a_1 \\ a_2 \\ \vdots \\ a_p \end{bmatrix} = \begin{bmatrix} R_1 \\ R_2 \\ \vdots \\ R_p \end{bmatrix}$$

The transfer function of the pre-whitening filter is:

$$H(z) = 1 - \sum_{k=1}^{p} a_k z^{-k}$$

Figure 11:
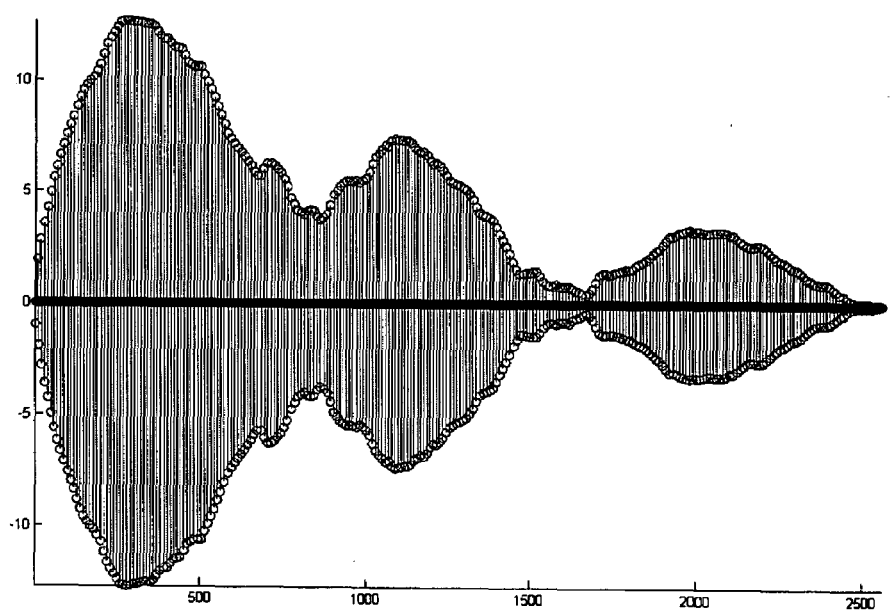
FIG. 11 the coefficients of the pre-whitening filter (Length of the GCS is 256).

FIG. 11 show the coefficients of the pre-whitening filter for GCS (N=256). After the pre-whitening, a matching filter is then applied to the white signal to get output of the de-convolution.

Amplitude normalization: the purpose of the amplitude normalization is to normalize the amplitude of echoes from different objects/scatterers. A "scatterer" is an interface that scatters a transmitted wave, thereby returning at least some echo. A "target" refers to a selected area of study within an object, which area may contain one or more scatterers. The amplitude of clutters is proportional to both the amplitude of the echoes and the displacement. By amplitude normalization, the amplitude of clutters will only be proportional to the displacement.

The method for amplitude normalization is: (1) demodulate the output of matching filter (signal M) and the original compressed pulses with mainlobe (signal C) using Hilbert transformation; (2) divide the demodulated signal M by signal C.

Two computer simulations are done to verify the algorithm shown in FIG. 10.

Figure 12:
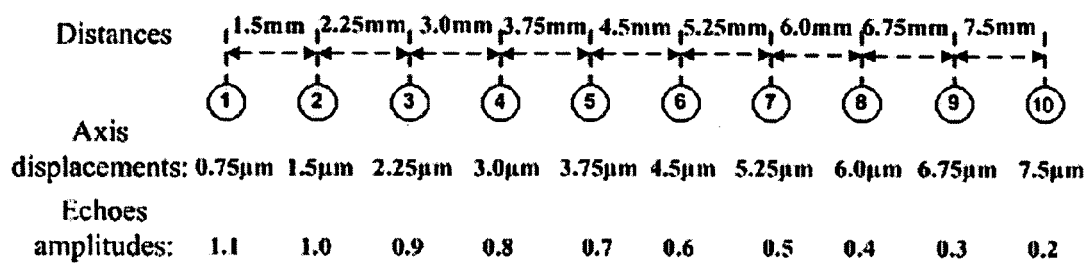
FIG. 12 distribution of the scatterers used in the simulation.
Figure 13A:
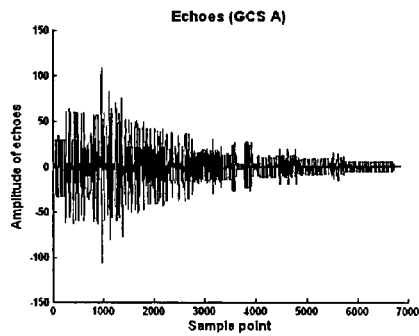
FIG. 13(*a*) Echoes of GCS A. (*b*) Echoes of GCS B. (*c*) Compressed pulses. (*d*) Clutter signals derived after mainlobe elimination. (*e*) Results of De-convolution. (*f*) Results of amplitude normalization and demodulation.
Figure 13B:
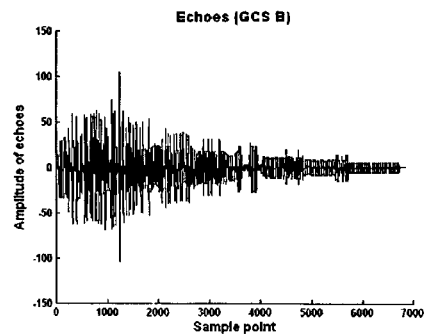
Figure 13C:
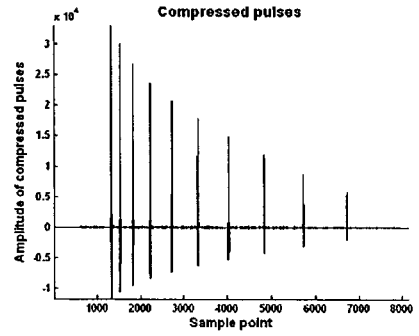
Figure 13D:
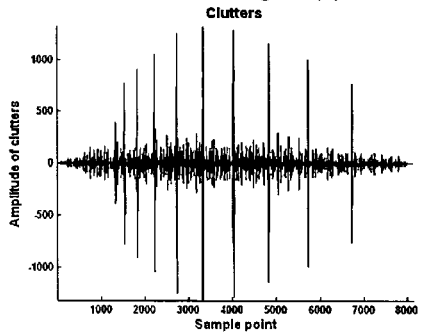
Figure 13E:
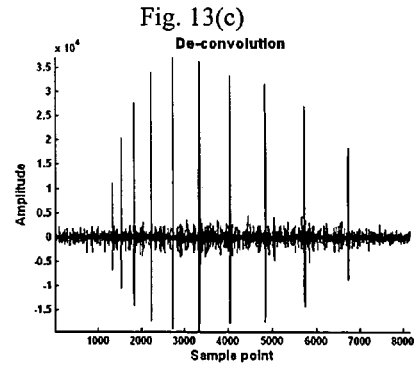
Figure 13F:
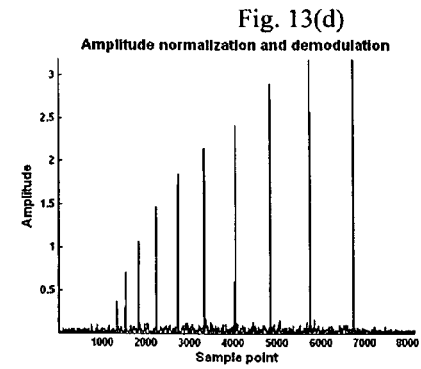

In the first simulation, a 10 MHz, 90% bandwidth transducer is used. The transmission frequency is 10 MHz. The sampling rate is 100 MHz. The code length is 128. The sampling of echoes starts after the 128 code is transmitted. The echoes between the transmissions of the first code and the last code are not available. That produces a short undetectable zone called dead zone. The dead zone of this simulation is 9.6 mm. Ten scatterers are placed along the ultrasound beam (FIG. 12). The distances between the scatterers are: 1.5 mm, 2.25 mm, 3.0 mm, 3.75 mm, 4.5 mm, 5.25 mm, 6.0 mm, 6.75 mm and 7.5 mm, as shown in FIG. 12. From left to right, the displacement of the scatterers are 0.75 μm, 1.5 μm, 2.25 μm, 3 μm, 3.75 μm, 4.5 μm, 5.25 μm, 6 μm, 6.75 μm and 7.5 μm, respectively. The amplitude of the echoes from each of the scatterers are 1.1, 1, 0.9, 0.8, 0.7, 0.6, 0.5, 0.4, 0.3 and 0.2.

The results of the simulations of each step are shown in FIG. 13. FIG. 13(a) shows respectively: Echoes of GCS A, (b) Echoes of GCS B, (c) Compressed pulses, (d) Clutters signals derived after mainlobe elimination, (e) Results of De-convolution, (f) Results of amplitude normalization and demodulation.

Figure 14:
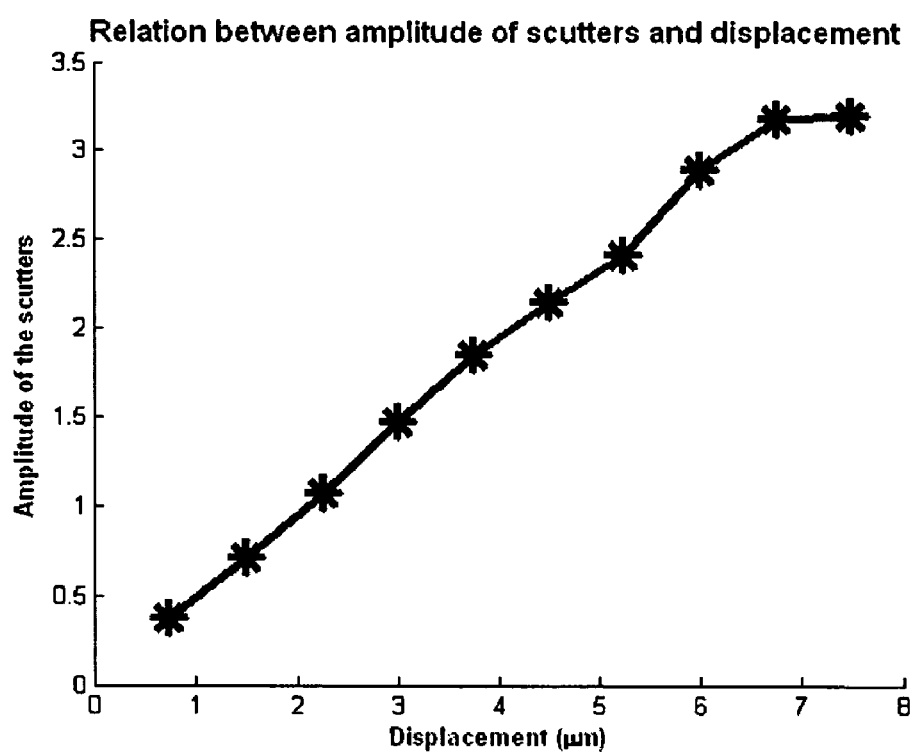
FIG. 14 the relation between the amplitude of the clutters (results after amplitude normalization) and the actual displacement controlled by the linear motor.

FIG. 14 compared the amplitudes of the clutters (after the amplitude normalization) and the real displacement. FIG. 14 shows that the results of amplitude normalization is proportional to the real displacement.

Figure 15:
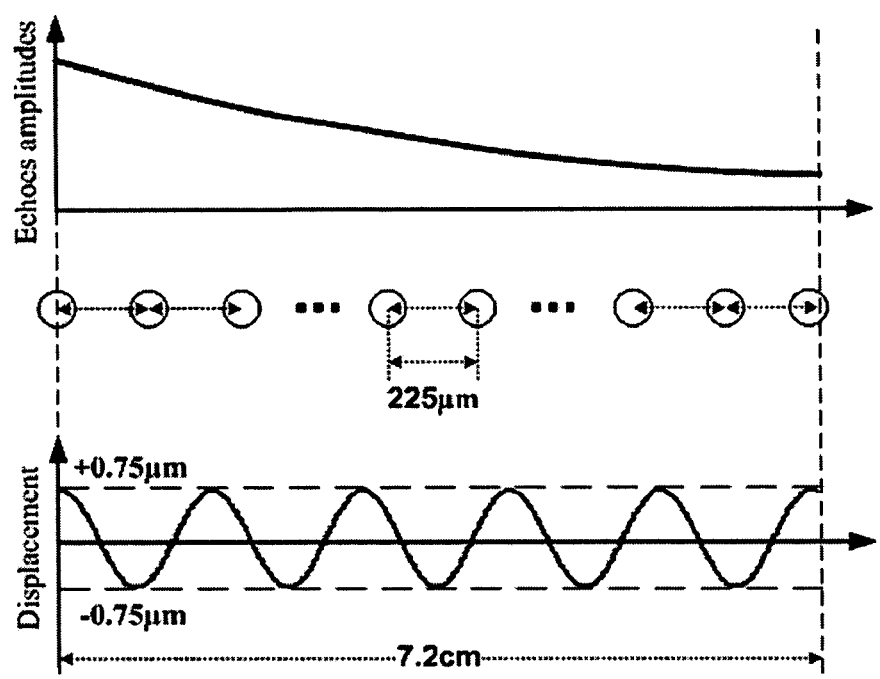
FIG. 15 setting of the scatterers for simulation.

In the second simulation, scatterers are distributed along the scan line evenly and the distance between scatterers is 225 µm. The amplitudes of the echoes from the scatterers have an exponential relation with the depth of the scatterers. The displacements of the scatterers have a sine distribution demonstrated in FIG. 15. The parameter settings of the ultrasound transducer and the GCS coded excitation are the same as those in the first simulation.

The results of the simulations of each step are shown in FIG. 16. FIG. 16(a) shows respectively: Echoes of GCS A, (b) Echoes of GCS B, (c) Compressed pulses, (d) Clutters signals derived after mainlobe elimination, (e) Results of De-convolution, (f) Results of amplitude normalization.

Figure 16A:
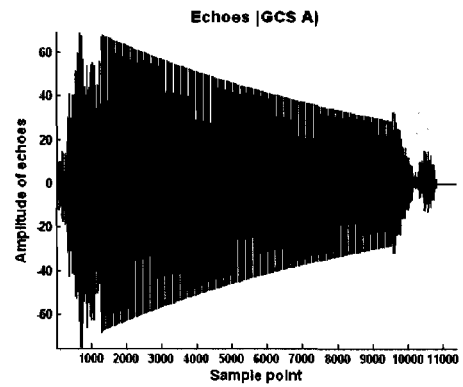
FIG. 16(*a*) Echoes of GCS A. (*b*) Echoes of GCS B. (*c*) Compressed pulses. (*d*) Clutter signals derived after mainlobe elimination. (*e*) Results of De-convolution. (*f*) Results of amplitude normalization.
Figure 16B:
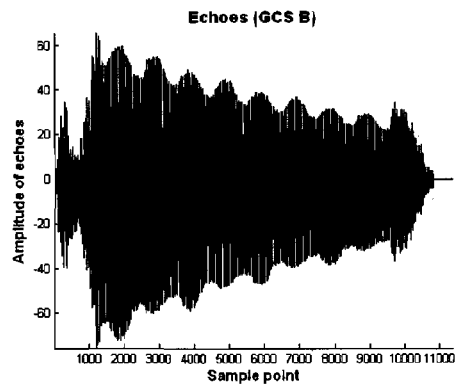
Figure 16C:
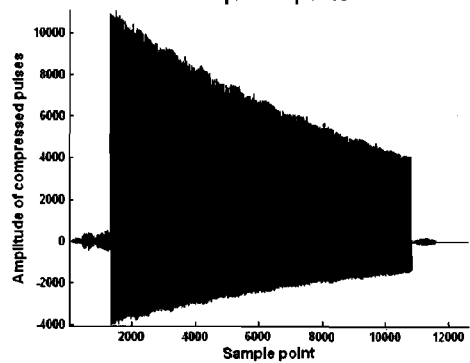
Figure 16D:
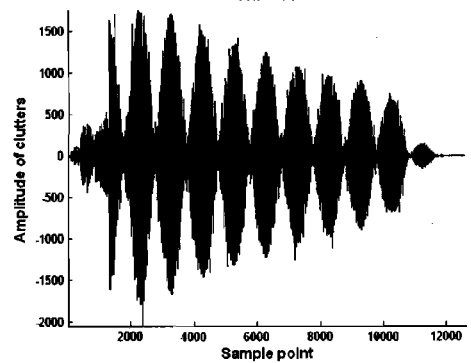
Figure 16E:
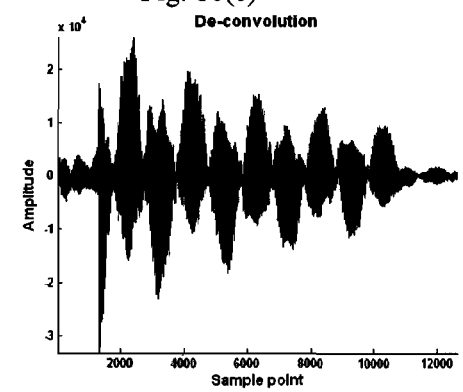
Figure 16F:
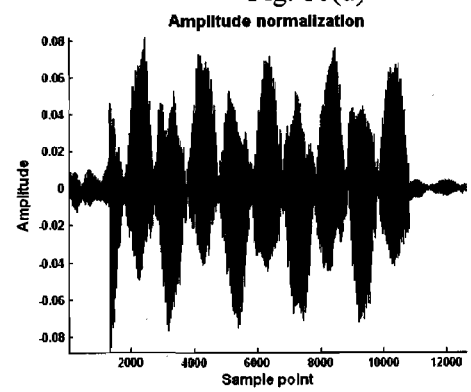
Figures 17A, 17B, 17C:
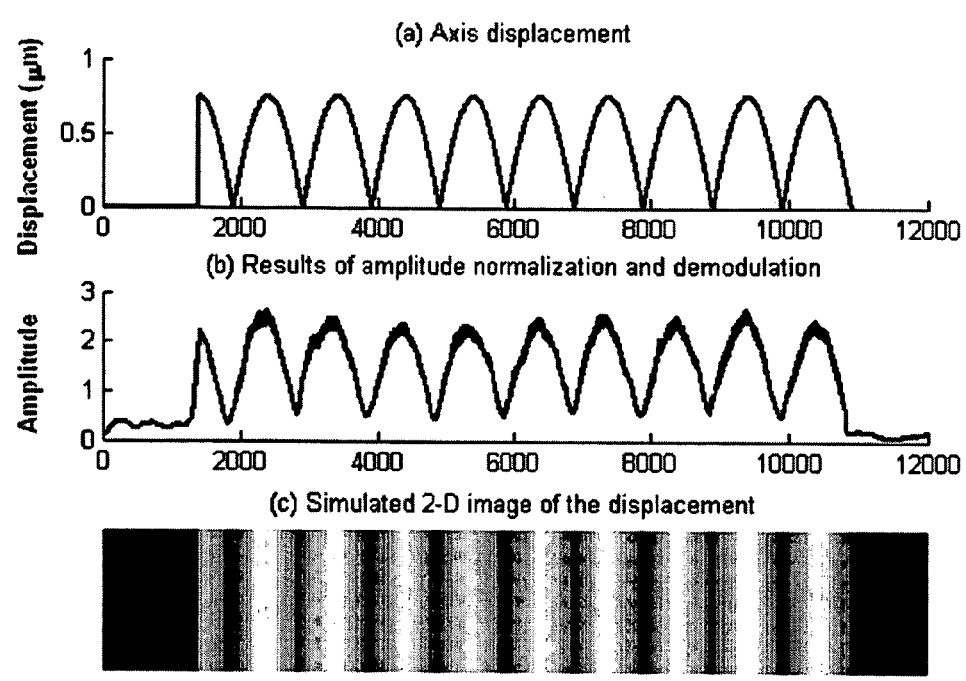
FIG. 17(*a*) the absolute value of the real axis displacement settings, (*b*) the envelope of waveform in FIG. 16(*f*). (*c*) Image of the simulated 2D distribution of displacement.

The absolute value of the real axis displacement settings and the envelope of waveform in FIG. 16(f) are compared in FIG. 17. The results show the algorithm described in FIG. 10 can measure very small displacement (±0.75 µm) in the desired reason of the object.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of measuring displacement of a desired region of an object with ultrasound, comprising:
   transmitting two complementary sequences;
   receiving echoes of said complementary sequences;
   performing pulse compression of the two echoes; and
   deriving displacement of a scatterer between two transmissions from residual clutter signals around a mainlobe of the compressed pulse output.

2. The method of claim 1 the transmitted signals are a pair of Golay's complementary sequences.

3. The method of claim 1 further comprising the step of auto-correlating said complementary sequences.

4. The method of claim 1 wherein at least one of a thickness, a velocity, a strain, an elastic stiffness, and a viscous damping, is derived from said derived displacement.

5. The method of claim 1 wherein the derived displacement is produced by the movement of a scatterer.

6. The method of claim 1 wherein the echoes are a reflection or scattering wave from the scatterer.

7. The method of claim 1 wherein the pulse compression comprises correlations of echoes A (B) with GCS codes A (B) and a sum of the two correlations.

8. The method of claim 1 wherein the mainlobe is the main peak of the compressed pulse.

9. The method of claim 1 wherein the residual clutter signals are the signals produced by one of the time shift of the two echoes or the displacement of a scatterer during two GCS transmissions.

10. The method of claim 1 further comprising the step of mainlobe elimination.

11. The method of claim 9 further comprising the step of clutter accumulation.

12. The method of claim 11 wherein the clutter accumulation is accumulating the energy of the clutter signals.

13. The method of claim 11 wherein the clutter accumulation is performed with a pre-whitening filter.

14. The method of claim 11 further comprising the step of matched filtering to accumulate the energy of the clutter signals.

15. The method of claim 1 wherein the displacement detection is derived from a relationship between the time shift and the amplitude of the clutter signals.

16. The method of claim 15 wherein the resolution of the relationship between the time shift an the amplitude of the clutter signal is improved by repeated interpolations.

17. The method of claim 1 wherein the displacement detection is derived by amplitude normalization.

18. The method of claim 17 wherein amplitude normalization is by eliminating the effect of the amplitude of echoes from different scatterers.

19. A displacement measurement apparatus for measuring a displacement of a desired target in a selected object, said apparatus comprising:
   a wave transmitter configured to transmit energy towards said target;
   a receiver configured to receive signal reflected from said target;
   a processor, said processor being configured to provide two complementary sequences to said wave transmitter and said processor being configured to measure the displacement of the target from a residual clutter signal around a mainlobe of said reflected or scattered signal from said two complementary sequences.

20. The apparatus of claim 19 wherein said two complementary sequences are Golay's complementary sequences.

21. The apparatus of claim 19 further comprising at least one of a signal generator, a preamplifier, a filter, a time gain compensation circuit and an analog digital conversion circuit, in operative communication with at least one of said transmitter or said receiver.

22. The apparatus of claim 21 wherein at least one of the pre-amplifier, filter and time gain compensation circuit is configured to amplify the echoes, filter the noise and compensate the energy loss of the echoes.

23. The apparatus of claim 19 wherein the processor is configured to control the timing of the transducer/receiver, a pre-amplifier, a filter and a time gain compensation circuit and an analog digital conversion circuit and to calculate the displacement of the object or the desired region of the object.

24. The apparatus of claim 20 wherein the transmitted signals are the pair of Golay's complementary sequences A and B or other complementary sequences, and a sum of an auto-correlation of complementary sequences A and B is a delta function.

25. The apparatus of claim 19 wherein said processor is further configured to derive at least one of a thickness, a velocity, a strain, an elastic stiffness, and a viscous damping.

26. The apparatus of claim 19 wherein said processor is further configured to derive a dimensional parameter produced by a movement of the target.

27. The apparatus of claim 19 wherein a displacement calculation comprises analyzing the residual clutter signals around the mainlobe of the compressed pulse output.

28. The apparatus of claim 19 further comprising a pulse compression.

29. The apparatus of claim 28 wherein said pulse compression comprises at least two correlations of echoes A (B) with GCS codes A (B) and a sum of the correlations.

30. The apparatus of claim 19 wherein a mainlobe is the main peak of the compressed pulse.

31. The apparatus of claim 19 wherein a clutter is a signal produced by a time shift of two echoes.

32. The apparatus of claim 19 wherein a clutter is a signal produced by a displacement of a target during two Golay complementary sequence transmissions.

33. The apparatus of claim 19 wherein a clutter analysis includes mainlobe elimination, clutter accumulation and displacement detection.

34. The apparatus of claim 19 wherein a clutter signal is obtained by a mainlobe elimination.

35. The apparatus of claim 19 further comprising clutter accumulation.

36. The apparatus of claim 35 wherein clutter accumulation includes a pre-whitening filter.

37. The apparatus of claim 35 further comprising matching filtering to accumulate an energy of the clutter signals.

38. The apparatus of claim 33 wherein displacement detection is from an accumulated clutter signal.

39. The apparatus of claim 19 wherein displacement detection is from a time-shift and clutter relation.

40. The apparatus of claim 39 wherein the resolution of the relationship between the time shift and the amplitude of the clutter signal is improved by repeated interpolations.

41. The apparatus of claim 19 wherein displacement detection is by amplitude normalization.

42. The apparatus of claim 41 wherein amplitude normalization eliminates an effect of the amplitudes of echoes from different objects or scatterers.

43. The method of claim 1 further comprising time shifting echoes of GCS B before pulse compression.

44. The method of claim 1 wherein said transmissions are one of a radar transmission and a sonar transmission.

45. The apparatus of claim 19 therein said transmissions are one of a radar transmission and a sonar transmission.

46. The method of claim 1 wherein only a single transmitter and single receiver are used for said transmitting and said receiving steps.

47. The apparatus of claim 19 wherein said wave transmitter is a single transmitter and said receiver is a single receiver.

* * * * *